(12) United States Patent
Kakeda et al.

(10) Patent No.: US 6,564,311 B2
(45) Date of Patent: *May 13, 2003

(54) APPARATUS FOR TRANSLATION BETWEEN VIRTUAL AND PHYSICAL ADDRESSES USING A VIRTUAL PAGE NUMBER, A PHYSICAL PAGE NUMBER, A PROCESS IDENTIFIER AND A GLOBAL BIT

(75) Inventors: Masahide Kakeda, Takatsuki (JP); Reiji Segawa, Ibaraki (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,343

(22) Filed: Jan. 19, 2000

(65) Prior Publication Data
US 2003/0070057 A1 Apr. 10, 2003

(30) Foreign Application Priority Data
Jan. 19, 1999 (JP) ............................................. 11-010139

(51) Int. Cl.$^7$ ............................................. G06F 12/00
(52) U.S. Cl. ........................ 711/207; 711/206; 711/203
(58) Field of Search ................................. 711/202, 203, 711/206, 207, 209

(56) References Cited

U.S. PATENT DOCUMENTS

| | | | | |
|---|---|---|---|---|
| 4,965,717 A | * | 10/1990 | Cutts et al. ................. | 711/148 |
| 5,226,133 A | * | 7/1993 | Taylor et al. ................ | 711/207 |
| 5,347,636 A | * | 9/1994 | Ooi et al. .................... | 711/203 |
| 5,564,052 A | * | 10/1996 | Nguyen et al. ................ | 365/49 |
| 5,588,111 A | * | 12/1996 | Cutts et al. ................... | 714/10 |
| 5,699,551 A | * | 12/1997 | Taylor et al. ................ | 711/122 |
| 5,754,818 A | | 5/1998 | Mohamed | |
| 6,098,150 A | * | 8/2000 | Brethour et al. ............ | 711/128 |
| 6,425,055 B1 | * | 7/2002 | Sager et al. ................ | 711/118 |
| 6,449,694 B1 | * | 9/2002 | Burgess et al. ............. | 711/128 |
| 6,477,613 B1 | * | 11/2002 | Arimilli et al. ............... | 711/3 |
| 6,493,812 B1 | * | 12/2002 | Lyon .......................... | 711/207 |

\* cited by examiner

*Primary Examiner*—Hong Kim
(74) *Attorney, Agent, or Firm*—Parkhurst & Wendel, L.L.P.

(57) ABSTRACT

An address translation apparatus comprises: entry storage means for storing a plurality of entries, each entry containing a virtual page number, a physical page number, and a process identifier which is composed of plural bits; comparison information storage means for storing comparison information which defines a method for comparing a process identifier possessed by a process that is currently executed, with the process identifier in each entry; process comparison means for comprising the process identifier possessed by the process that is currently executed, with the process identifier in the entry, on the basis of the comparison information; and entry retrieval means for retrieving, from the entry storage means, an entry including a virtual page number equal to a virtual page number supplied from the outside, and a process identifier which matches the process identifier of the currently executed process, according to the result of comparison by the process comparison means. Therefore, when a physical memory has a content which can be shared between at least two processes, effective utilization of memory area can be achieved by unifying entries with respect to these processes.

3 Claims, 5 Drawing Sheets

| Entry | VPN | PID | G | PPN |
|---|---|---|---|---|
| e1 | 0x020 | 0xE1 | 00 | 0x030 |
| e2 | 0x020 | 0xA0 | 01 | 0x040 |
| e3 | 0x030 | 0x0C | 10 | 0x090 |
| e4 | 0x030 | 0xF3 | 00 | 0x100 |
| e5 | 0x040 | 0xB0 | 01 | 0x100 |
| e6 | 0x040 | 0xF3 | 00 | 0x130 |
| e7 | 0x050 | 0x00 | 11 | 0x160 |

Fig.5

| Entry | VPN | PID | G | PPN |
|---|---|---|---|---|
| E1 | 0x020 | 0xE1 | 0 | 0x030 |
| E2 | 0x020 | 0xA2 | 0 | 0x040 |
| E3 | 0x020 | 0xAC | 0 | 0x040 |
| E4 | 0x030 | 0xAC | 0 | 0x090 |
| E5 | 0x030 | 0xBC | 0 | 0x090 |
| E6 | 0x030 | 0xF3 | 0 | 0x100 |
| E7 | 0x040 | 0xB2 | 0 | 0x100 |
| E8 | 0x040 | 0xBC | 0 | 0x130 |
| E9 | 0x030 | 0xB3 | 0 | 0x100 |
| E10 | 0x050 | 0xE1 | 0 | 0x160 |
| E11 | 0x050 | 0xA2 | 0 | 0x160 |
| E12 | 0x050 | 0xAC | 0 | 0x160 |
| E13 | 0x050 | 0xBC | 0 | 0x160 |
| E14 | 0x050 | 0xB2 | 0 | 0x160 |
| E15 | 0x050 | 0xF3 | 0 | 0x160 |

APPARATUS FOR TRANSLATION BETWEEN VIRTUAL AND PHYSICAL ADDRESSES USING A VIRTUAL PAGE NUMBER, A PHYSICAL PAGE NUMBER, A PROCESS IDENTIFIER AND A GLOBAL BIT

FIELD OF THE INVENTION

The present invention relates to an apparatus for translating virtual addresses stored in a virtual storage to physical addresses and, more particularly, to an address translation apparatus which permits plural processes to share an address translation entry. The invention also relates to a computer system including this address translation apparatus.

BACKGROUND OF THE INVENTION

A virtual storage method has been widely adopted as a technique for reducing the load on programming, against the limit of the capacity of a main memory in a computer. In the virtual storage, a large-capacity virtual memory is created by controlling a main memory and an auxiliary memory (e.g., a hard disk) so as to supplement the memory capacity by using an operation system or the like, thereby logically realizing a large-capacity main memory. Further, when adopting the virtual storage, only the data required for activating a program can be stored in the main memory, plural programs can share the memory with high efficiency.

In the virtual storage, it is necessary to translate virtual addresses indicating addresses in the virtual memory, to physical addresses indicating addresses in the actual main memory.

Generally, a virtual address is separable into a virtual page number and an in-page offset, and also a physical address is separable into a physical page number and an in-page offset. In address translation, a page table in which virtual page numbers are associated with the corresponding physical page numbers is prepared in advance, and a physical page number is extracted from a requested virtual address with reference to this page table, thereby translating the virtual address to the physical address. Since the in-page offset of the virtual address is equal to that of the corresponding physical address, a physical address is generated by connecting a predetermined in-page offset to the physical page number.

By the way, since the page table is very large in size, it must be stored in the main memory. Accordingly, every time a request for access to the main memory is output from a CPU, two accesses (i.e., access to the page table and access to the actual data) are made to the main memory, thereby generating a delay in processing time. In order to avoid such delay in processing time, recently a translation look-aside buffer (hereinafter referred to as "TLB") has been used in addition to the page table.

The TLB is a cash memory for address translation only, in which virtual page numbers of high frequency and the corresponding physical page numbers are stored, amongst those stored in the page table. When the CPU accesses the main memory, the TLB is searched first, and only when the desired virtual address is not stored in the TLB, the page table is searched. By appropriately setting the contents of the TLB to increase the hit ratio of the TLB, highly efficient access to the main memory is realized.

Hereinafter, the structure of the TLB will be described in brief. The TLB has a plurality of entries, and each entry contains a virtual page number, a physical page number, and a process identifier composed of plural bits. Therefore, when an entry is referred to, a virtual page number and a corresponding physical page number are known. Each entry is separated into a tag section and a data section. The tag section is composed of a virtual page number, a process identifier indicating a process, a global bit which defines as to whether the process identifier should be referred to or not, and the like. The data section is composed of a physical page number and the like.

The purpose of giving the process identifier is to prevent the virtual addresses from being confused due to coexistence of different processes.

To be specific, a plurality of processes, which are simultaneously executed by a computer, share a TLB, and each process can independently set a virtual address space. So, the virtual addresses used by the respective processes may overlap, and there may occur plural entries in which the same vertical page number corresponds to different physical page numbers. Therefore, in principle, a process identifier is given to each entry, and a physical address is extracted from an entry in which the process identifier is equal to the process identifier of a process which requires a virtual address, whereby error address translation is avoided and memory protection is achieved amongst the processes.

Further, also in the case where two or more different processes use the same virtual address corresponding to the same physical address, when a specific process is being executed and therefore the other process should not make access to this physical address, decision is made by using the process identifiers of these processes.

On the other hand, when there is a physical address which can be shared among plural processes, the same virtual address corresponding to this physical address is used for each of the respective process identifiers, whereby the entries which are to be provided process by process are grouped to reduce the number of entries corresponding to the same virtual address. Thus, the memory area of the TLB having a relatively small memory capacity can be used with efficiency.

Further, the hit ratio of the TLB can be increased by storing more entries in a vacant space which is made as the result of the sharing.

Since address translation is performed using the virtual page number alone when plural processes share an entry, each entry is provided with a global bit (one bit) which defines as to whether the process identifier should be referred to or not. When an entry is shared among plural processes, its global bit is made active so as not to ask about matching of process identifiers. Since matching of process identifiers is not decided when the global bit is active, an entry the global bit of which is active is shared amongst all the processes.

When the TLB so constructed receives a request for an virtual address from the CPU, an entry which contains a virtual page number constituting this virtual address is retrieved. To be specific, when the global bit is inactive ("0"), an entry having the same process identifier as that of the currently executed process is retrieved. On the other hand, when the global bit is active ("1"), an entry the virtual page number of which is equal to that of the requested virtual address is retrieved without regard to matching of process identifiers. When there is an entry that satisfies the condition, a translation hit signal is output to the CPU, and the physical page number stored in this entry is translated to a physical address to be sent to the CPU.

By the way, for the sake of memory protection, it is impossible to permit all processes in a physical memory to share a physical address relating to a certain content stored in the physical memory. However, depending on the contents of the programs, some of these processes may share the physical address. However, in the conventional TLB, because of its construction, all the processes cannot but share the physical address. Therefore, even when plural processes which can share the physical address are included in the physical memory, the entries relating to these processes cannot be unified, and an entry corresponding to each process should be formed for the sake of memory protection. That is, when there is a physical address which can be shared among some processes as described above, the memory area of the TLB is wastefully used with respect to the group of these processes.

Further, if the entries are unified such that all of the processes can share a physical address for effective utilization of the memory area, some processes which should not use the physical address can make access to this physical access. As the result, memory protection is not achieved.

SUMMARY OF THE INVENTION

The present invention is made to solve the above-described problems and has for its object to provide an address translation apparatus which can effectively utilize a memory area and achieve memory protection by unifying entries with respect to some processes which are permitted to share a content stored in a physical memory.

It is another object of the present invention to provide a computer system having this address translation apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an address translation apparatus comprising: entry storage means for storing a plurality of entries, each entry containing a virtual page number, a physical page number, and a process identifier which is composed of plural bits; comparison information storage means for storing comparison information which defines a method for comparing a process identifier possessed by a process that is currently executed, with the process identifier in each entry; process comparison means for comprising the process identifier possessed by the process that is currently executed, with the process identifier in the entry, on the basis of the comparison information; and entry retrieval means for retrieving, from the entry storage means, an entry including a virtual page number equal to a virtual page number supplied from the outside, and a process identifier which matches the process identifier of the currently executed process, according to the result of the comparison by the process comparison means.

According to a second aspect of the present invention, in the above-described address translation apparatus, each entry is provided with the comparison information storage means, and the comparison information is global bits.

According to a third aspect of the present invention, in the above-described address translation apparatus, the comparison information defines at least two kinds of comparison methods, and one of the comparison methods is a method for comparing part of plural bits constituting the process identifier possessed by the currently executed process, with the corresponding part of plural bits constituting the process identifier of the entry.

According to a fourth aspect of the present invention, there is provided a computer system having the above-described address translation apparatus.

DETAILED DESCRIPTION OF THE PREFERRED EMBODIMENTS

Hereinafter, an embodiment of the present invention will be described with reference to the drawings.

Figure 1:
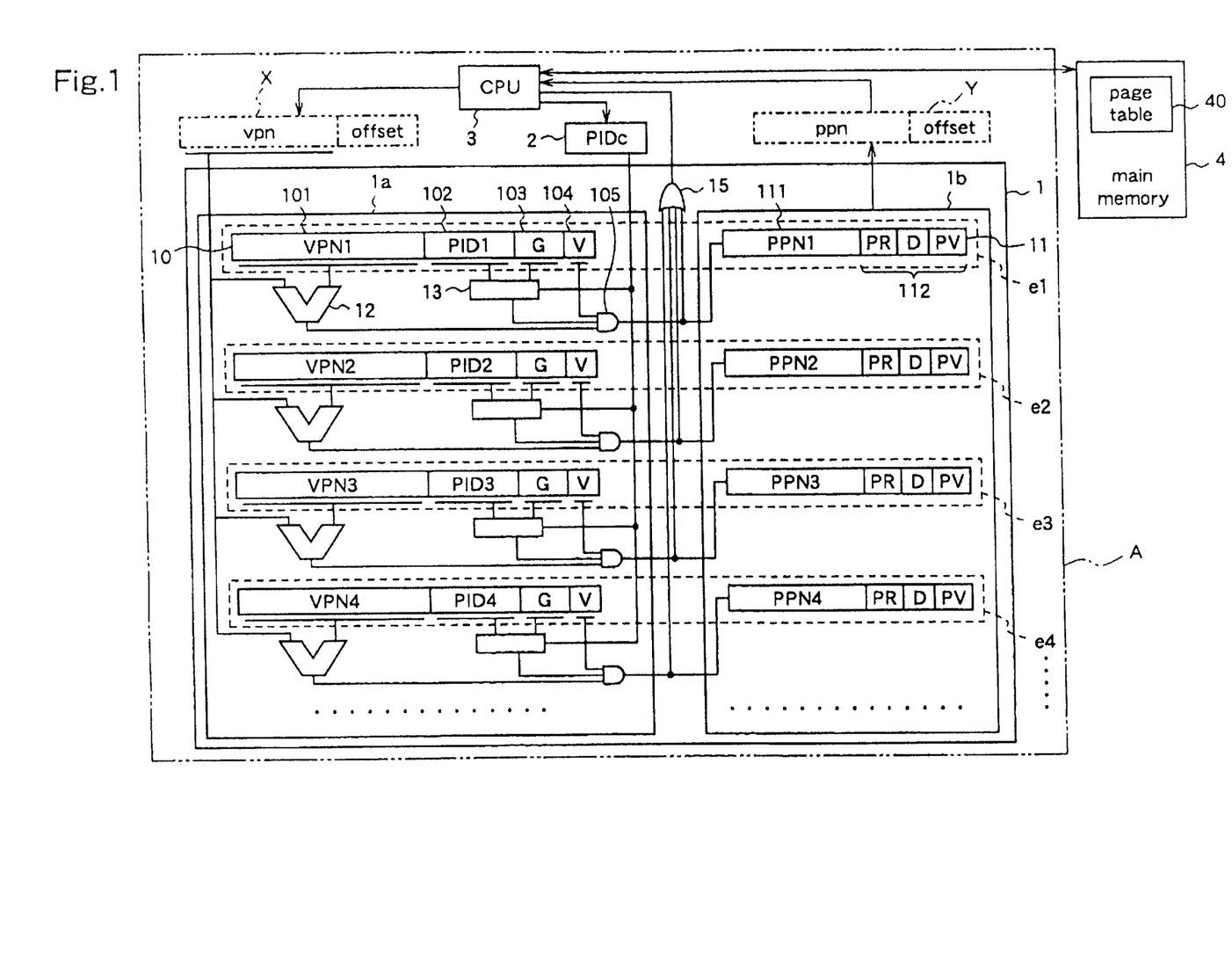
FIG. 1 is a block diagram illustrating the structure of an address translation apparatus according to an embodiment of the present invention.

FIG. 1 is a block diagram illustrating the structure of a TLB 1 as an address translation apparatus according to the present invention.

The TLB 1 is contained in a packet A including a CPU 3. The TLB 1 is implemented by a memory unit which can make quick access to the CPU 3, and it is controlled by an operating software and a controller.

Further, the TLB 1 is connected to a control register 2 for storing a process identifier PIDc of a process which is currently executed. The control register 2 is updated every time the CPU 3 changes the process to be executed. These units are incorporated into a general computer system which is not shown in the figure.

The TLB 1 includes a tag array unit 1a and a data array unit 1b which are entry storage means for storing plural pieces of entries e, each containing a virtual page number, a physical page number, and a process identifier comprising plural bits. The TLB 1 further includes first comparators 12 and second comparators 13. Each of the second comparators 13 is a process comparator for comparing the process identifier possessed by the currently executed process with the process identifier included in the corresponding entry. Each of the first comparators 12 is entry retrieval means for retrieving a required entry from the tag array unit 1a and the data array unit 1b. The TLB 1 further includes AND gates 105.

In this embodiment, comparison information storage means for storing comparison information which defines a method for comparing the process identifier of the currently executed process with the process identifier stored in the corresponding entry, is provided in the entry as a global bit storage area 103 and a valid bit storage area 104. However, the comparison information storage means may be provided in a place other than mentioned above.

Further, in this embodiment, the comparison information which defines a method for comparing the process identifier of the currently executed process with the process identifier stored in the corresponding entry is global bits. However, the form of the comparison information is not restricted thereto.

Hereinafter, the constituents of the TLB 1 will be described.

Initially, the entries e, the tag array unit 10a, and the data array unit 1b will be described. Each entry e stores a virtual page number and a physical page number which are associated with each other. A plurality of entries e are stored as e1, e2, e3, e4, . . . in the TLB 1.

Each entry e is separated into a tag section 10 including a virtual page number and a data section 11 including the corresponding physical page number.

The tag sections 10 of all the entries e1, e2, e3, e4, . . . are arranged in the tag array unit 1a, while the data sections 11 of all the entries are arranged in the data array unit 1b.

That is, the tag array unit 1a and the data array unit 1b serve as entry storage means in the TLB1.

The tag section 10 comprises a virtual page number storage are 101, a process identifier storage area 102, a global bit storage area 103, and a valid bit storage area 104. In the tag section 10 of each entry (e1, e2, e3, e4, . . . ), a virtual page number VPN is stored in the virtual page number storage area 101, a process identifier PID is stored in the process identifier storage area 102, global bits G are stored in the global bit storage area 103, and a valid bit V is stored in the valid bit storage bit 104.

The valid bit V is provided with regard to the case where the virtual page number in entry is not associated with the physical page number when the UPU 3 is reset in the program. When the valid bit V is active, it indicates that the physical page number in the current entry is correctly associated with the virtual page number. When the valid bit V is inactive, it indicates that these page numbers are not currently associated with each other.

The data section 11 comprises a physical page number storage area 111 and a page attribute storage area 112. In the data section 11 of each entry (e1, e2, e3, e4, . . . ), a physical page number PPN is stored in the physical page number storage area 111, and page attribute information is stored in the page attribute storage area 112. The page attribute information comprises a page protection bit PR, a dirty bit D, and a page valid bit PV. The page attribute information may include other than these data, or some of these data.

In this embodiment, each process identifier comprises a first half part of four bits and a second half part of four bits, i.e., it comprises data of eight bits in total. That is, the process identifier indicates a specific process by the whole eight bits, and the first-half four bits and the second-half four bits are also given specific meanings, respectively.

Furthermore, the global bits G are data of two bits, and this 2-bit data is comparison data for deciding a process identifier comparison method from four kinds of process identifier comparison methods. The four kinds of process identifier comparison methods are as follows. When comprising plural bits constituting the process identifier possessed by the currently executed process with plural bits constituting the process identifier in the entry, (1) both of the whole (full bits) process identifiers are compared, (2) comparison of these process identifiers is not performed, (3) only the upper bits of these process identifiers are compared, (4) only the lower bits of these process identifiers are compared.

Next, the first comparator 12 and the second comparator 13 will be described.

The first comparator 12 compares a virtual page number vpn constituting part of a virtual address X requested by the CPU 3, with the virtual page number VPN stored in the virtual page number storage area 101.

The second comparator 13 compares the process identifier PIDc of the currently executed process, which is transmitted from the control register 2, with the process identifier PID stored in the process identifier storage area 102, according to the global bits G.

The first comparator 12 and the second comparator 13 are connected to the stage section 10 of each entry.

Now, the second comparator 13 serving as process comparison means will be described in more detail.

Figure 2:
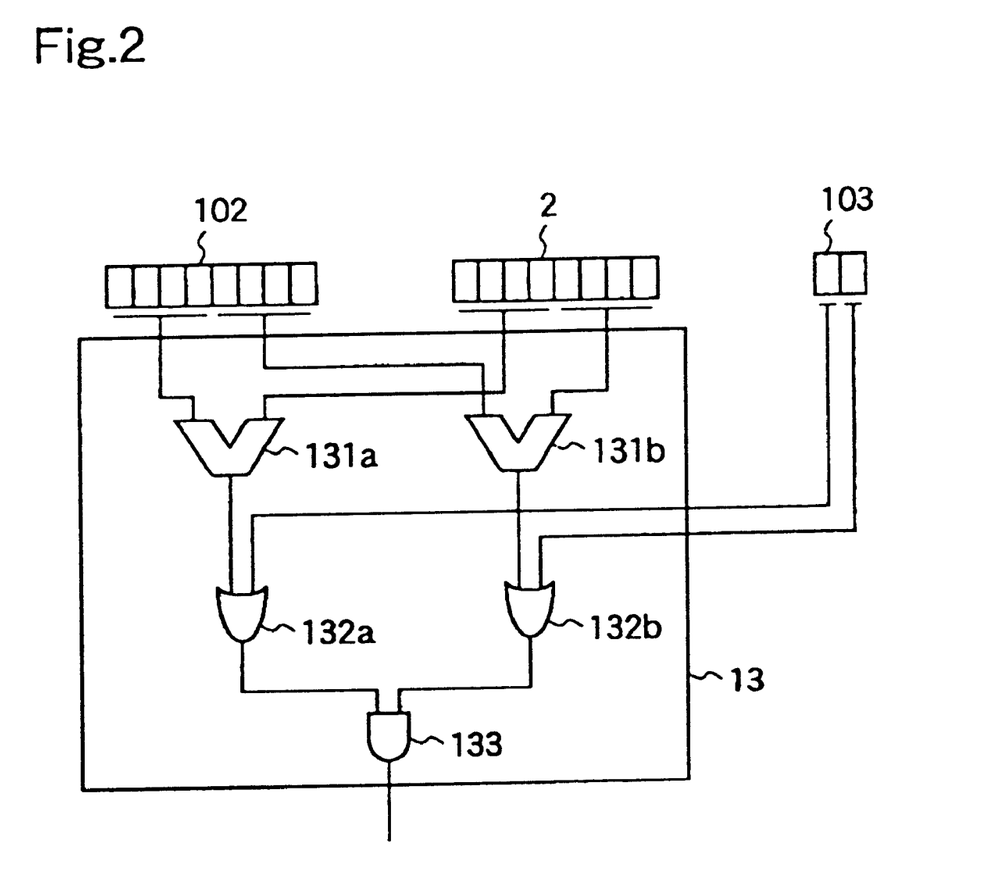
FIG. 2 is a block diagram illustrating the structure of a second comparator.

FIG. 2 is a block diagram illustrating the structure of the second comparator 13. The second comparator 13 comprises an upper bit comparator 131a, a lower bit comparator 131b, an OR gate 132a for upper bits (hereinafter referred to as an upper bit OR gate), an OR gate 132b for lower bits (hereinafter referred to as a lower bit OR gate), and an AND gate 133.

The constituents of the second comparator 13 operate as follows. The upper bit comparator 131a compares the upper four bits of the process identifier PIDc stored in the control register 2 with the upper four bits of the process identifier PID stored in the process identifier storage area 102. The lower bit comparator 131b compares the lower four bits of the process identifier PIDc stored in the control register 2 with the lower four bits of the process identifier PID stored in the process identifier storage area 102.

The upper bit OR gate 132a ORs the upper one bit of the global bits G stored in the global bit storage area 103, with the output value from the upper bit comparator 131a. The lower bit OR gate 132b ORs the lower one bit of the global bits G stored in the global bit storage area 103, with the output value from the lower bit comparator 131b.

The AND gate 133 ANDs the output value from the upper bit OR gate 132a with the output value from the lower bit OR gate 132b.

The output value from the AND gate 133 is the output value from the second comparator 13.

Now, a description will be given of comparison of the process identifier possessed by the currently executed process with the process identifier in the entry, by the second comparator 13 which is constituted as described above.

Since the output value from the upper bit comparator 131a is ORed with the upper one bit of the global bits G, the output value from the upper bit comparator 131a has the meaning only when the upper bit of the global bits G is "0". When the upper bit of the global bits G is "1", the upper four bits of the PIDc stored in the control register 2 are not compared with the upper four bits of the PID stored in the process identifier storage area 102. Likewise, since the output value from the lower bit comparator 131b is ORed with the lower one bit of the global bits G, the output value from the lower bit comparator 131b has the meaning only when the lower bit of the global bits G is "0". When the lower bit of the global bits G is "1", the lower four bits of the PIDc are not compared with the lower four bits of the PID.

That is, when the global bits G are "01", the AND gate 133 outputs "1" so long as the upper four bits of the PIDc match the upper four bits of the PID. When the global bits G are "10", the AND gate 133 outputs "1" so long as the lower four bits of the PIDc match the lower four bits of the PID.

When the global bits G are "00", both of matching of the upper four bits of the respective process identifiers and matching of the lower four bits of the respective process identifiers are required, i.e., perfect matching of the process identifiers is required. When the global bits G are "11", the output value from the AND gate 133 is always "1" regardless of the process identifiers.

In other words, the second comparator 13 compares the whole process identifier PIDc with the whole process identifier PID when the global bits G are "00", compares the upper four bits of the PIDc with the upper four bits of the PID when the global bits G are "01", compares the lower four bits of the PIDc with the lower four bits of the PID when the global bits G are "10", and does not compare the PIDc with the PID when the global bits G are "11". In this way, the second comparator 13 performs four kinds of comparisons of process identifiers.

The output value from the second comparison 13, the output value indicating the result of comparison by the first comparator 12, and the value of the valid bit V stored in the valid bit storage area 104, and ANDed by the AND gate 14 serving as entry retrieval means.

That is, only when the comparison results from the first and second comparators 12 and 13 are "match" and the valid bit is active, i.e., only when an appropriate virtual page number exists, "1" is output from the AND gate 14.

In this embodiment, the entry retrieval means is constituted by the first comparator 12 and the AND gate 14.

Hereinafter, the entry retrieval means will be described. An entry retrieval method employed by the entry retrieval means is not restricted to that described below.

Initially, the output value from each AND gate 105 is sent to the data section 11 and to the OR gate 15. In the OR gate 15, the output values from all of the AND gates 105 are ORed. The output value "1" from the OR gate 15 is output as a hit signal to the CPU 3 while the output value "0" from the OR gate 15 is output as a miss signal to the CPU 3.

On receipt of "1" from the AND gate 105, the data section 11 of each entry e outputs the physical page number PPN stored in the physical page number storage area 111. The physical page number PPN so output is connected to the in-page offset to be sent to the CPU 3 as a physical address Y. In this way, entry retrieval is performed.

Next, a description will be given of setting of process identifiers each comprising plural parts, and setting of the corresponding entries.

Figure 3:
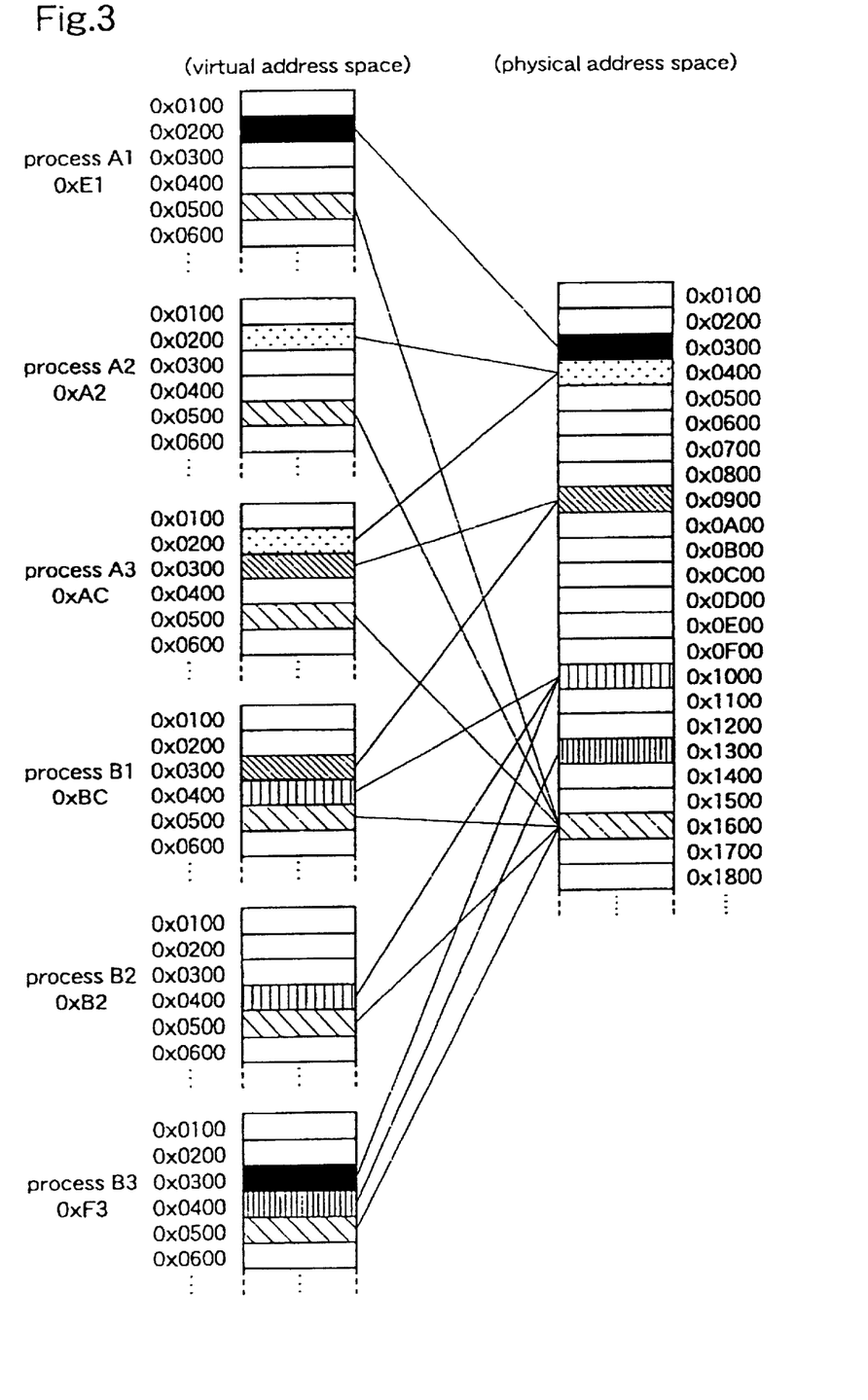
FIG. 3 is a schematic diagram for explaining allocation of virtual address and physical addresses to plural processes.

It is assumed that memory areas are allocated to plural processes as shown in FIG. 3. FIG. 3 shows virtual address areas to be used by six processes A1, A2, A3, B1, B2, B3, and physical address areas which are set for the respective virtual address areas. In FIG. 3, the memory areas being used are filled with various patterns, and each virtual address area is connected with the corresponding physical address area by a line.

The process A1~A3 constitute an application A, and the processes B1~B3 constitute another application B. A process identifier of each process is given beneath the process.

With reference to FIG. 3, in the virtual address space used by the respective processes, virtual address 0×0500 is used by all of the processes, and the corresponding physical address 0×1600 is common to these processes. Accordingly, all of the processes can share the combination of the virtual address 0×0500 and the physical address 0×1600.

With respect to virtual address 0×0200, this virtual address is used by the processes A2 and A3, and corresponds to physical address 0×0400. Therefore, these processes can share the virtual address 0×0200 and the physical address 0×0400.

However, in the process A1, the virtual address 0×0200 corresponds to another physical address 0×0300. Therefore, the combination of virtual address 0×0200 and physical address 0×0400 cannot be shared among all the processes, but it can be shared only between the process A2 and the process A3. Similar partial sharing occurs with respect to the combination of virtual address 0×0300 and physical address 0×0900 for the process A3 and the process B1, and the combination of virtual address 0×0400 and physical address 0×0100 for the process B1 and the process B2. Further, each of the process A3 and the process B1 shares different addresses with different two processes.

Hereinafter, a description will be given of an example of setting process identifiers when memory allocation is performed as described above.

Since the address translation apparatus according to the embodiment of the invention performs partial comparison of process identifiers, when parts of process identifiers of processes which share an address are made equal, these processes can be grouped.

For example, since the process A2 and the process A3 are in the same application, the upper four bits of the process identifiers of these processes are set at "A"(1010). Likewise, since the process B1 and the process 2 are in the same application, the upper four bits of the process identifiers of these processes are set to "B"(1011). As for the process A3 and the process B1, since the upper four bits have already been decided, only the lower four bits of the process identifiers of these processes are set to, for example, "C" (1100).

Accordingly, the process identifiers of the process A3 and the process B1 are set to "AC" and "BC", respectively.

With respect to the process A2 and the process A3, the lower four bits of its process identifier may be arbitrarily set as long as the whole process identifier does not overlap another process identifier and the lower four bits do not overlap the common part of a process identifier which performs partial sharing by using the same virtual address as that used by itself. Further, with respect to the process A1 and the process B3, its process identifier may be arbitrarily set as long as the whole process identifier does not overlap another process identifier and each part of the process identifier does not overlap the common part of a process identifier which performs partial sharing by using the same virtual address as that used by itself.

In this embodiment of the invention, process identifiers as shown in FIG. 3 are given to the respective processes.

In this way, by making the upper four bits or the lower four bits of process identifiers of plural processes common to these processes, these processes can be grouped.

Next, a description will be given of setting of global bits G according to the above-described setting of process identifiers.

Initially, with respect to the combination of virtual address 0×0500 and the physical address 0×1600, since all of the processes can share this combination, the global bits G are set to "11" so that no comparison of process identifiers is performed.

With respect to the combination of virtual address 0×0200 and physical address 0×0400, only the processes A2 and A3 share this combination, and the process identifiers of these two processes have the same upper four bits as described above. Therefore, the global bits G are set to "01" so that only the upper four bits of the respective process identifiers are compared.

With respect to the combination of virtual address 0×0300 and physical address 0×0900 which is shared between the processes A3 and B1, since the process identifiers of these processes have the same lower four bits, the global bits G are set to "10" so that only the lower four bits of the respective process identifiers are compared.

Further, with respect to the combination of virtual address 0×0200 and physical address 0×0300, since this combination is used by only the process A1, the global bits G are set to "00" so that the whole process identifier is compared for data protection.

Figure 4:
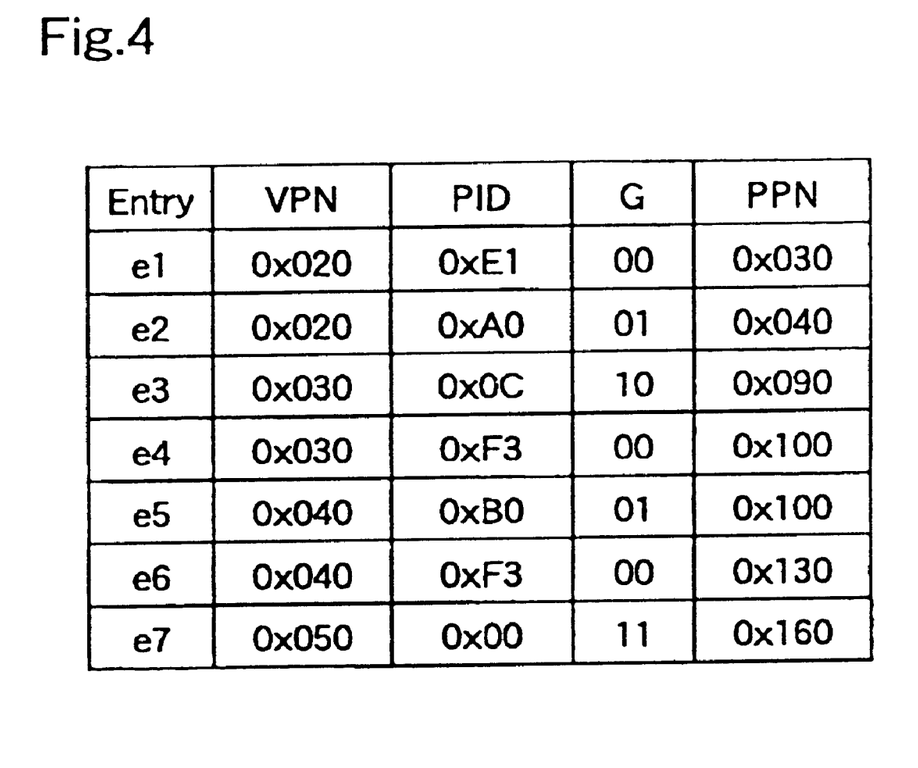
FIG. 4 is a table showing data in entries corresponding to the virtual addresses and physical addresses shown in FIG. 3.

When the global bits G are defined by the above-mentioned method, in each entry, the virtual page number VPN, the process identifier PID, the global bits G, and the physical page number PPN are set as shown in FIG. 4, for performing allocation of memory areas as shown in FIG. 3.

The lower one bit corresponding to the in-page offset is removed from the virtual address and the physical address to represent the virtual page number and the physical page number, respectively. Further, amongst the upper and lower bits of the process identifier recorded in the entry, those which are not compared according to the global bits G are given "0". However, this value is not restricted to "0".

The global bits G and the process identifier PID so set are recorded in each entry by a program executed by the CPU 3.

Figure 5:
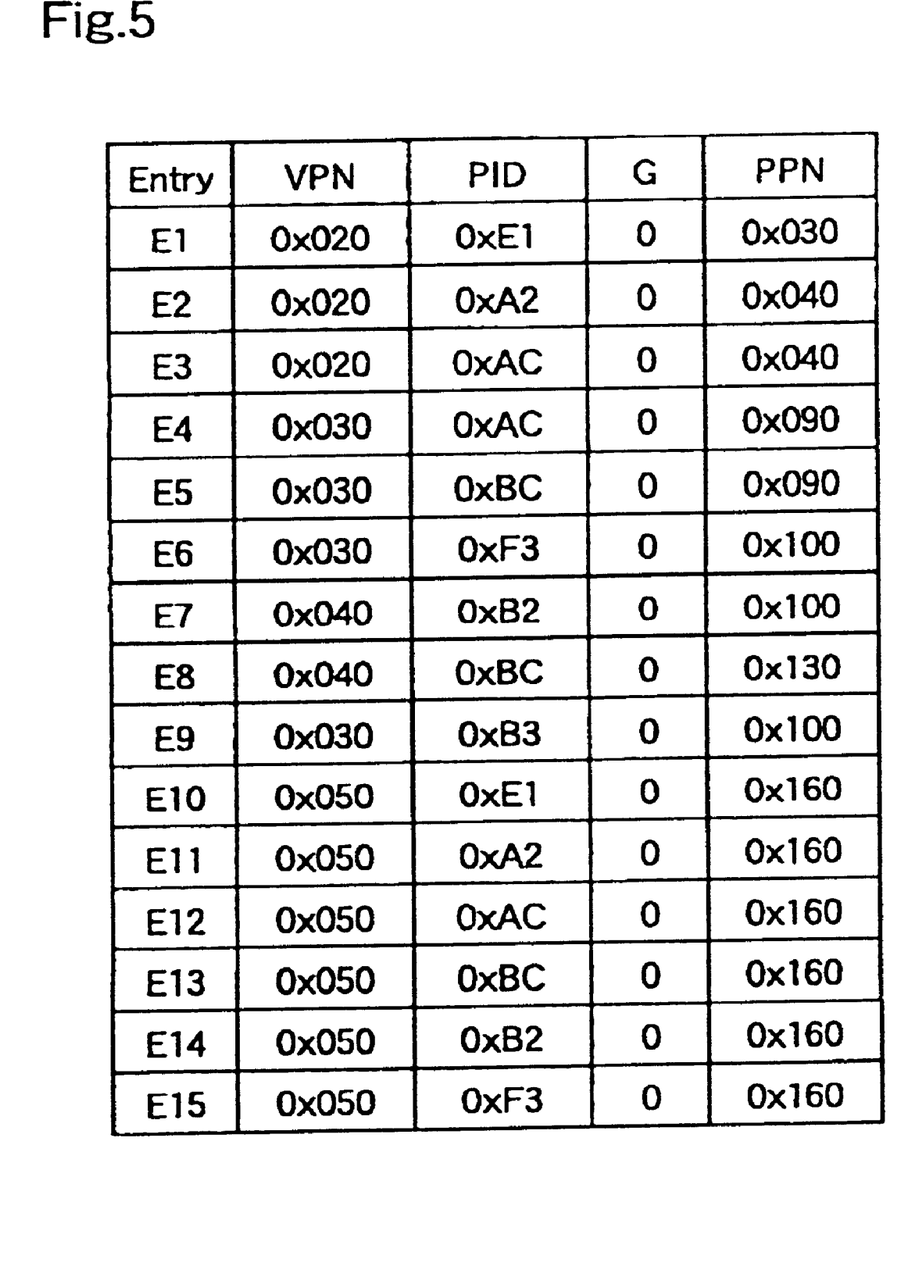
FIG. 5 is a table showing data in entries corresponding to the virtual addresses and physical addresses shown in FIG. 3 in the case where the global bit is one bit.

FIG. 5 shows the relationships amongst the virtual page number VPN, the process identifier PID, the global bit G, and the physical page number PPN in each entry in the case where allocation of memory areas is performed by the conventional address translation apparatus which uses one bit as the global bit G. Now, these data shown in FIG. 5 are compared with the data shown in FIG. 4 according to the embodiment of the present invention.

First of all, in the entry e1 shown in FIG. 4, since the global bits G are "00", the whole process identifier PIDc is compared with the whole process identifier PID (hereinafter, referred to as whole PID comparison). Also in the conventional case, in the entry E1 shown in FIG. 5, whole PID comparison is carried out.

In the entry e2 shown in FIG. 4, since the global bits are "01", the upper four bits of the process identifier PIDc are compared with the upper four bits of the process identifier PID (hereinafter referred to as partial PID comparison). In this case, no comparison is performed for the lower four bits. So, it is necessary to allocate one of the virtual addresses (0×0200~0×02ff) shown in FIG. 3, which is to be translated to a physical address, to the entry. While only the entry e2 is needed in the case of FIG. 4, two entries E2 and E3 are needed in the conventional case as shown in FIG. 5.

In the entry e3 shown in FIG. 4, since the global bits are "10", partial PID comparison is performed with respect to the lower four bits of the process identifiers. In this case, no comparison is performed for the upper four bits. So, it is necessary to allocate one of the virtual addresses (0×0300~0×03ff) shown in FIG. 3, which is to be translated to a physical address, to the entry. Although only the entry e3 is needed in the case of FIG. 4, two entries E4 and E5 are needed in the conventional case shown in FIG. 5.

In the entry e4 shown in FIG. 4, since the global bits are "00", whole PID comparison is performed. Also in the conventional case, whole PID comparison is performed in the entry E6 shown in FIG. 5.

In the entry e5 shown in FIG. 4, since the global bits are "01", partial PID comparison is performed with respect to the upper four bits of the process identifiers. In this case, no comparison is performed for the lower four bits. So it is necessary to allocate one of the virtual addresses (0×0400~0×04ff) shown in FIG. 3, which is to be translated to a physical address, to the entry. Although only the entry e5 is needed in the case of FIG. 4, two entries E7 and E8 are needed in the conventional case as shown in FIG. 5.

In the entry e6 shown in FIG. 4, since the global bits are "00", whole PID comparison is carried out. Also in the conventional case, whole PID comparison is performed in the entry E9 shown in FIG. 5.

In the entry e7 shown in FIG. 4, since the global bits are "11", no comparison is performed. In the conventional case, since the global bit is one bit, it is necessary to allocate each virtual address to be translated to a physical address, to each entry. That is, entries E10~E15 are needed as shown in FIG. 5.

As described above, in the conventional address translation apparatus which uses one bit as the global bit G, fifteen entries corresponding to the virtual addresses and the physical addresses shown in FIG. 3 are needed. On the other hand, in the embodiment of the present invention, since two bits are used as the global bits G, only the entries having the global bits "01" and "10" are needed and so the number of entries is reduced to seven, resulting in effective utilization of entries. Moreover, data protection is achieved. This effect becomes more and more conspicuous as the number of processes which perform partial sharing increases.

Hereinafter, the operation of the TLB 1 constructed as described above will be described.

It is assumed that the data shown in FIG. 4 are stored in the respective entries e1~e7 of the TLB 1.

First of all, when a request for virtual address X is output from the CPU 3, the first comparator 12 in each entry decides whether or not the virtual page number vpn as a component of this virtual address X matches the virtual page number VPN stored in the VPN storage area 101. At the same time, the second comparator 13 in each entry compares the process identifier PIDc of the currently executed process which is stored in the control register 2, with the process identifier PID stored in the process identifier storage area 102 in the entry, according to the value of the global bits G.

When there is some entry in which the results of comparison by the first comparator 12 and the second comparator 13 are "match" and the valid bit V is active, the output value from the AND gate 14 of this entry is "1".

It is now assumed that the vertical page number of the requested virtual address X is "0×020" and the process identifier PIDc of the currently executed process is "A2". In this case, the values of the output signals from the first comparators 12 of the entries e2 and e2 are "1". In the second comparator 13 of the entry e1, since the global bits G are "00", the whole PIDc is compared with the whole PID of the entry e1. Since the process identifier PID of the entry e1 is "E1", this does not match the PIDc "A2" of the currently executed process and, therefore, the output signal value becomes "1".

On the other hand, in the second comparator 12 of the entry e2, since the global bits G are "01", the upper four bits of the PIDc are compared with the upper four bits of the PID of the entry e2. Since the PID of the entry e2 is "A0", the upper four bits of this PID match the upper four bits of the PIDc "A2" of the currently executed process and, therefore, the output value becomes "1".

Accordingly, when the valid bit V of the entry e2 is active, a signal value "1" is output from the AND gate 14 of the entry e2.

The signal value "1" from the AND gate 14 is transmitted, as a hit signal, through the OR gate 15 to the CPU 3. At the same time, the data section 11 of the entry where the AND gate 14 exists, outputs the physical page number PPN stored in the physical page number storage area 111. Assuming that the AND gate 14 of the entry e2 outputs "1", the data section 11 of the entry e2 outputs the physical page number "0x040".

This physical page number is given an in-page offset, and then transmitted to the CPU 3 as a physical address Y. The CPU 3 accesses the main memory 4 on the basis of this physical address to obtain desired data of the like.

When none of the AND gates 14 of the entries outputs "1", a signal value "0" is output as a miss signal from the OR gate 15 to the CPU 3. On receipt of this miss signal, the CPU 3 accesses the page table 40 in the main memory 4 to perform address translation according to the page table 40.

As described above, in the TLB 1 according to the present invention, when comparing the process identifier PID stored in each entry with the process identifier PIDc of the currently executed process, it is possible to perform, not only whole PID comparison and non comparison, but also partial PID comparison in accordance with the global bits G.

Since the TLB 1 can perform such partial PID comparison, when some processes share a virtual address and a physical access, by making parts of process identifiers of these processes equal, these processes can be grouped.

Thereby, the number of entries can be reduced to effectively utilize the memory area of the TLB, while achieving data protection. Further, by increasing the number of combinations of virtual addresses and physical addresses to be stored substantially, the hit ratio of the TLB can be increased.

In the aforementioned embodiment of the invention, processes using the same physical address corresponding to the same virtual address are grouped. However, there is a case where access to the common physical address should be restricted for a certain process (first process) while other processes (second processes) are being executed, because of the character of the program.

In this case, only the second processes are grouped by making parts of their process identifiers equal, and the process identifier of the first process is made completely different from those of the second processes.

Further, while in the embodiment of the invention two bits are used as the global bits G, arbitrary number of bits may be used.

For example, when one process shares three or more different parts with other processes, each process identifier is divided into three or more parts to group the processes with respect to each part, and three or more bits are used as the global bits G to specify one of whole PID comparison, non-comparison, and partial PID comparisons corresponding to the respective parts.

Further, it is also possible to specify one of whole PID comparison and partial PID comparison by using one bit as the global bit G.

To be specific, partial PID comparison is performed instead of non-comparison. For example, in FIG. 3, since all of the processes share the combination of virtual address 0x0500 and physical address 0x1600, usually no comparison is performed. If the process A1 should be inhibited from accessing this area while other processes are being executed, all of the processes are subjected to whole PID comparison in the conventional case.

In the present invention, each process identifier is divided into the lowest one bit and the other part, and the lowest one bit of the process identifier of each process other than the process A1 is set to "1" while the lowest one bit of the process identifier of the process A1 is set to "0", and partial PID comparison of the lowest one bit and whole PID comparison are performed according to the global bit G. In this case, partial PID comparison is performed for the combination of virtual address 0x0500 and physical address 0x1600 according to the global bit G, whereby the entries of the processes A2~B3 can be unified. Further, perfect sharing identical to the conventional non-comparison can be realized by making the values of all the lowest bits equal.

Although these is no difference from the conventional address translation apparatus in using one bit as the global bit G, since the above-described idea is employed, the same effects as described for the embodiment of the invention are achieved.

Further, while the embodiment of the invention a process identifier is divided into upper four bits and lower four bits, the way of dividing a process identifier is not restricted thereto.

For example, assuming that a process identifier is composed of 8 bits, this process identifier may be divided into four parts. In this case, unused parts may be generated by using only the upper two bits and the third two bits for partial PID comparison, or an overlapped part may be generated by using upper four bits and upper six bits.

Further, while in the embodiment of the invention the global bit storage area 102 in each entry is used as comparison information storage means, the comparison information storage means is not restricted thereto. For example, when storing a process identifier PID in the process identifier storage area 102 in the entry, a part of the PID which is not subjected to comparison is set to "0" (0000) as shown in FIG. 4, and "0" (0000) is not used for the upper four bits and the lower four bits of the process identifier given to each process. When "0" is stored in the upper four bits or the lower four bits of the PID stored in the second comparator 13, this part is not subjected to comparison, whereby partial PID comparison is performed.

In this case, the global bit G is dispensed with. Furthermore, comparison information storage means may be constituted by the global bit storage area 103 and the process identifier storage area 102 to increase the quantity of comparison information. Moreover, comparison information storage means may be provided outside the TLB 1.

While in the embodiment of the invention emphasis has been placed on an address translation buffer, a page table as an address translation apparatus is also within the scope of the present invention, and process identifiers can be used in the page table in like manner as described above.

Furthermore, a computer system may be provided with the above-described address translation apparatus. In this case, by effectively utilizing the memory area of the address translation apparatus, the hit ratio increases, whereby the processing speed of the computer system increases. Further, since data protection is also achieved, there is no increase in malfunction.

What is claimed is:
1. An address translation apparatus comprising:
   entry storage means for storing a plurality of entries, each entry containing a virtual page number, a physical page number, and a process identifier composed of plural bits;

comparison information storage means for storing comparison information for defining at least two kinds of comparison methods, one of said comparison methods being a comparison of respective parts between a process identifier possessed by a process that is currently executed, with the process identifier in each entry;

process comparison means for comparing the process identifier possessed by the process that is currently executed, with the process identifier in the entry, on the basis of the comparison information; and entry retrieval means for retrieving, from the entry storage means, an entry including a virtual page number equal to a virtual page number supplied from the outside, and a process identifier which matches the process identifier of the currently executed process, according to the result of comparison by the process comparison means.

2. The address transition apparatus of claim 1, wherein each entry is provided with said comparison information storage means, and said comparison information is global bits.

3. The address translation apparatus of claim 1, wherein said address translation apparatus is part of a computer system.

* * * * *